M. CORNINE.
INDEX.
APPLICATION FILED JUNE 21, 1909.
979,437.
Patented Dec. 27, 1910.
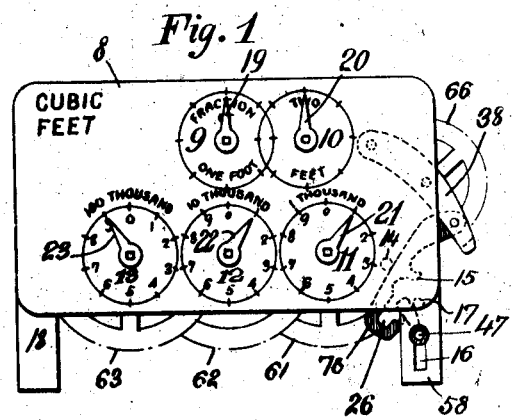
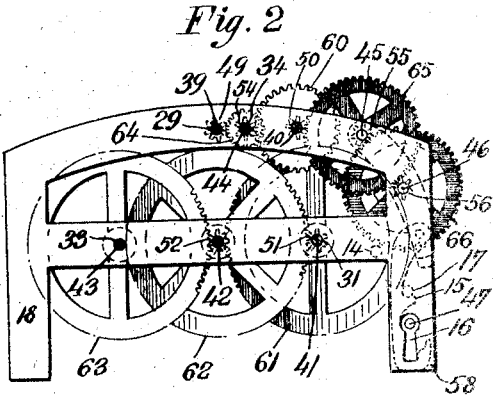
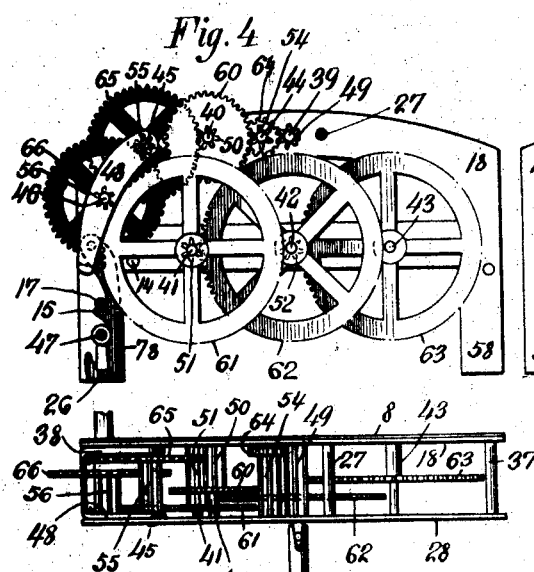
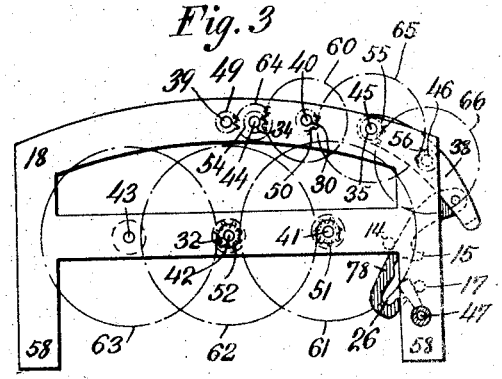
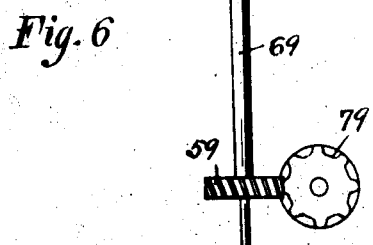
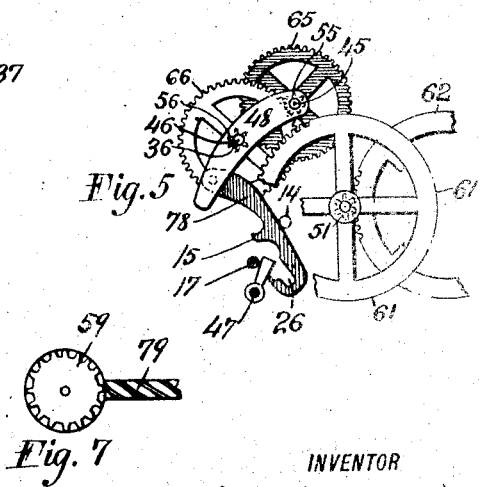
WITNESSES:
INVENTOR
Marshall Cornine
BY his ATTORNEY

UNITED STATES PATENT OFFICE.

MARSHALL CORNINE, OF NEW YORK, N. Y.

INDEX.

979,437.  Specification of Letters Patent.  Patented Dec. 27, 1910.

Application filed June 21, 1909. Serial No. 503,363.

*To all whom it may concern:*

Be it known that I, MARSHALL CORNINE, a citizen of the United States, and a resident of Manhattan, New York city, in the county of New York and State of New York, have invented certain new and useful Improvements in Indexes, of which the following is a specification.

My invention relates to an index for a meter or an analogous device and consists in the peculiar arrangement of the parts which permits it to be quickly returned to zero, and yet practically insures that those parts will always be left in operative position, also in connecting the working parts of the meter directly to the fast moving hand or pointer of the index and in the arrangement of parts which permits such connection.

To meet modern conditions meters must be frequently tested, often at their places of installation and sometimes at the factory or repair shop. When they are tested at the place of installation, the time of an inspector is occupied, consequently there has, for some time, been a demand for an index which would permit of that being done rapidly. When they are tested at the factory or repair shop, it is usually required that they be turned to zero before being again put into use, and here again speed is necessary, for in industrial matters, it is daily more evident that the time of employees is money, and dividends will be less or absent if the greatest economy is not exercised in the use of that time. It would take much time to return to zero an index which had reached a record of thousands, if it were turned back by merely reversing the movement by which it has reached its high registry, turning for that purpose, the gear connected, or to be connected, to the meter crank. Consequently, it has been the custom to pry the frame apart, disengage the several wheels of the train and run them back separately, but this is objectionable. First, it takes some time to replace the separate parts. Second, it often strains those parts, so that thereafter they do not operate with precision. Third, it often results that they are not properly reassembled and some of the train are not engaged at all, so that though the indicators on the dials of lower denominations operate, there is no movement of those parts on the dials of higher denominations and consequently, in gas meters, no record of all the gas used.

Many persons have essayed to arrange for economizing time in resetting an index or in inspecting a meter in place, but none of their devices of which I have knowledge, have been without objections. In my device I have arranged to permit a rapid but accurate inspection—in place—by connecting the meter crank directly to the fast moving indicator of the index, thereby avoiding a system of gearing in which the train is first geared down to accommodate a lower indicator and then geared up from its shaft to the shaft of the fast moving indicator, a system which not only presents the objection of requiring more time than it should for testing, but also the objection that gearing down from high to low is more likely to result in binding, if close, than from low to high. If not so close, then, lost motion is a common result, and lost motion interferes so materially with the accuracy of the test, that testing has not, heretofore, been done from the fast moving hand.

In arranging to gear direct from the meter crank to the fast moving hand, I have made some changes in the mechanism, transmitting motion from the crank to the indicator shaft, since it would not be practicable to gear direct, with the gears now in general use. They would be liable to lock or clog and interfere with the proper working of the device.

As is well known, a meter index is operated by the turning of a shaft of what is called the meter crank, an arm so connected with the levers of the bellows of the meter, as to make a rotation with the passage of a given quantity of gas—say 192 inches— through the meter. It has been customary to place a gear on this shaft and, in mesh with it, to mount a toothed gear on a shaft which, in turn, is keyed to the spindle or arbor of one of the intermediate indicators of the index and by a series or train of gears to communicate the movement of that intermediate shaft, to the faster and also to the slower indicators of the series. The gear in common use, has such a pitch that one revolution of the shaft of the meter crank will turn an 18 toothed wheel, on the indicator shaft, the space of one tooth. That shaft may carry a 48 toothed wheel, meshing on a 12 toothed wheel on the shaft of the fast moving hand. Consequently to gear direct from the gear on the shaft of the meter crank to the rapid moving indicator and get the same speed it now has, would require a toothed wheel of at least 72 teeth on the shaft of the fast moving indicator, which is not practicable. I therefore provide the shaft of the meter and the shaft of the indicator with what are sometimes called spiral gear wheels of such pitch that with eight teeth of a given pitch on that part of the gear on the shaft of the meter crank, and sixteen of a different pitch on the gear mounted on the shaft attached to the fast moving hand, I can cause the movements of the said hand to correctly indicate the quantity of gas which has passed through the meter, thus obviating the difficulties heretofore announced.

One form of the index I have devised is shown in the drawings, though I do not limit myself to a machine which is, in all details a duplicate of the one shown.

Figure 1, is a face view of such an index, separated from the meter, with the gear unlocked. Fig. 2, is a front view of the same meter, with the hands and the dial plate removed, and the gears locked. Fig. 3, is a view of the same parts shown in Fig. 2, but in the positions which they occupy when the gears operating the indicators of the dials of low denominations are disengaged from the train of wheels more closely connected to the indicators of the dials of higher denominations. Fig. 4, is a rear view of the meter from which the rear plate of the frame has been removed, but which is otherwise in operative position. Fig. 5, is a rear view of a portion of the index, showing the parts in the position they occupy when the respective trains are disengaged. Fig. 6, is an upper plan view of the index showing the connection between the shaft of the fast moving hand and the shaft on the meter crank. Fig. 7, is a detail view of the particular form of gearing I use for making the connection indicated in Fig. 6.

8, is the ordinary meter index face, showing dials 9—13 for indicating, respectively, a fraction of a foot, two feet, a thousand feet, ten thousand feet and one hundred thousand feet. These dials are provided with hands, pointers or indicators 19—23, carried on rotary shafts 39—43.

18 is the front plate of the main frame and 28 the rear plate. They are secured together by shouldered posts 17, 27, 37, and provided with arms or extensions 58, 68 (68 being the extension of the plate 28, not shown in the drawings) by means of which they may be soldered fast or otherwise secured in place upon the face of the meter, and are also pierced with holes 29—33 to receive the ends of the arbors or shafts 39—43 of the hands 19—23, 34 for that of an intermediate gear 64, (which I prefer to locate between shaft 39 and shaft 40), and 35 for the shaft 45 of another gear 65 in the train from wheel 60. There is also a gear in the train, intermediate the pinion 55 on shaft 45 and the toothed wheel 61 on shaft 41. I prefer not to mount the shaft 46 of this gear in the main frame, but in a supplementary frame pivoted to the main frame, preferably at 35 by means of the shaft 45 of gear 65. This supplemental frame is composed of two arms 38, 48, preferably joined at the lower part as shown, apertured to receive the ends of arbor 45 to pivot it, and also at 36 to receive the ends of arbor or shaft 46 of the wheel 66 and pinion 56. Then a key way 16 is cut in the extension 58, and from the frame 38 there is an extension 78, provided with a key way 26, (which normally registers with key way 16), and a hook 15, which normally takes under the post 17, which connects the front and rear frames. To guide and properly stop the key, I provide a post 47, mounted on the extension 28, and a stop 14 may be secured to the frame 18.

The arbor 39 of the fast moving hand is locked to a connecting shaft 69, and on the farther end of this shaft I mount a spirally toothed gear wheel 59 which meshes with another spirally toothed gear wheel 79 on the shaft of the meter crank.

Now when the shaft of the meter crank is operated by the passage of gas through the meter, it will turn the gear 79 and the train of transmission will be gear 59 shaft 69 and 39 (directly connected) which extends through holes 29 and carries hand 19 of dial 9, whereby the fast moving hand 19 of dial 9 will be operated in unison with the meter. As it is connected directly to the shaft 69 and turns quite rapidly, (indicating the consumption of a fraction of a foot of gas) a test of the meter may be quickly and accurately made by lighting a burner of given capacity and noting the movement of hand 19 for a space of but a few (sometimes less than 1) minutes, and the charge for inspector's time for that inspection is very small. If the shaft 69 were connected to some other hand then the time occupied would be much longer, since in that event, it would not suffice to note the movement of hand 19, for only one revolution as lost motion and the liability of that hand to jump when geared indirectly to the power shaft, would prevent certainty of accuracy, unless operated for more than a single revolution. For a test, certainty is a prerequisite and for a rapid test, that certainty must attend every revolution.

The train of transmission from shaft 39, is by pinion 49, toothed wheel 64, pinion 54, toothed wheel 60, pinion 50, toothed wheel 65, pinion 55, toothed wheel 66, pinion 56, toothed wheel 61, pinion 51, toothed wheel 62, pinion 52, toothed wheel 63, and the respective pinions and wheels having been cut with the proper number of teeth, the shafts 44, 40, 45, 46, 41, 42, 43, will be turned with suitable relative speed to cause the respective hands 20, 21, 22, 23, to indicate the quantity of gas consumed, up to the capacity of the index.

After having indicated a consumption of say 89,124 feet of gas, if the meter should be returned to the factory for repairs or for official inspection, it is desirable, before placing it again in use, to return all of the hands to zero. But in my device this is easily accomplished. A key is inserted through key hole 16 and sealed upon the key post 47 which permits it to enter so far that its bit will clear the inner side of extension 18, but not the wall of the hole 26 in extension 78. Then by turning the key, its bit acting against the edge of extension 78 will force that to the left, as seen in Figs. 1 and 3 (left as seen in Fig. 5), disengage hook 15 from post 17, and then lift the extension 78 and also the frame 38, 48, which will swing upon its pivot 45 and carry its supported pinion 56 from engagement with the peripheral teeth of wheel 61. Thereupon the train, now separated into two, may be very readily and quickly returned to zero. The bit of the key, however has turned under the extension 58, and cannot be drawn out with the other parts in their present positions, consequently it is necessary to reverse the key movement. This will bring its bit against the opposite wall of the hole 26, in extension 78, and swing that and the frame 38, 48, downward and backward till hook 15 takes under post 17 and pinion 56 again engages the teeth of wheel 61, when the parts of the index will be in normal position and it will be ready to accurately indicate the movement of the meter. There is sufficient play between the positions of the pinion and the wheel when their respective teeth are engaged to the bottoms of the indentations and those when they are engaged sufficiently to work smoothly, without binding, to permit the hook to be forced under post 17, and then engage it so that it cannot be disengaged without force, and this play renders an independent spring unnecessary.

It will be noted that any inadvertent leaving of the pinion and wheel disengaged is practically precluded for the reason that the presence of the key would at once call attention to the fact that the index is not in condition for use and when the key is removed, that removal insures the bringing of the parts back to normal position.

What I claim as my invention and desire to secure by Letters Patent, is:—

1. In an index, the combination with a frame, of a train of gears carrying indicators, some of high speed and others of low speed, a gear interposed between parts of the train of different speeds, means for disengaging said intermediate gear from another of the complete train, and means for again engaging it with said other gear of the train, said means being adapted to be operated by a key, an aperture in the device permitting the insertion of a key to operate said means, but provided with a stop adapted to restrain the withdrawal of the key, when turned from its position as inserted, all substantially as set forth.

2. In an index, the combination with a frame of a train of gears carrying indicators, some of high speed and others of low speed, of a gear interposed between the high speed and the low speed parts of the train, a swinging frame supporting said intermediate gear, an aperture in the main part adapted to permit the insertion of a key, an extension on the swinging frame, which registers with the aperture in the main frame, adapted to be engaged by the key, and walls to the keyhole, adapted to restrain the withdrawal of the key, when turned from its position as inserted, all substantially as set forth.

Signed at New York in the county of New York and State of New York this 17" day of June A. D. 1909.

MARSHALL CORNINE.

Witnesses:
JAMES A. DONEGAN,
A. G. N. VERMILYA.